United States Patent
Dawson et al.

(10) Patent No.: US 6,902,370 B2
(45) Date of Patent: Jun. 7, 2005

(54) TELESCOPING WIND TURBINE BLADE

(75) Inventors: Mark H. Dawson, Boise, ID (US); Jack A. Wallace, Yucaipa, CA (US)

(73) Assignee: Energy Unlimited, Inc., West Conshohocken, PA (US)

( * ) Notice: Subject to any disclaimer, the term of this patent is extended or adjusted under 35 U.S.C. 154(b) by 0 days.

(21) Appl. No.: 10/164,959

(22) Filed: Jun. 4, 2002

(65) Prior Publication Data

US 2003/0223868 A1 Dec. 4, 2003

(51) Int. Cl.$^7$ ................................................ F03D 7/00
(52) U.S. Cl. ........................... 415/4.1; 415/4.3; 416/23; 416/87; 416/DIG. 4
(58) Field of Search ........................... 415/4.1, 4.3, 4.5, 415/905, 908; 416/87, 88, 89, 23, 32, 226, DIG. 4; 290/55

(56) References Cited

U.S. PATENT DOCUMENTS

| | | | | |
|---|---|---|---|---|
| 1,077,187 A | * | 10/1913 | Bissell | 416/89 |
| 4,710,101 A | * | 12/1987 | Jamieson | 416/32 |
| 5,630,705 A | * | 5/1997 | Eikelenboom | 416/142 |
| 5,636,969 A | * | 6/1997 | Matuska et al. | 416/87 |
| 5,642,982 A | * | 7/1997 | Matuska et al. | 416/87 |
| 6,726,439 B2 | | 4/2004 | Mikhail et al. | |
| 2003/0023898 A1 | | 1/2003 | Jamieson et al. | |
| 2003/0044274 A1 | | 3/2003 | Deane et al. | |

FOREIGN PATENT DOCUMENTS

| | | | | |
|---|---|---|---|---|
| DE | 4428731 A1 | * | 2/1996 | F03D/1/06 |
| WO | WO 03/036082 A1 | | 5/2003 | |

* cited by examiner

Primary Examiner—Edward K. Look
Assistant Examiner—Dwayne J. White
(74) Attorney, Agent, or Firm—John Vanden Bosche

(57) ABSTRACT

A wind turbine blade made of a fixed blade section with an integral mounting flange for attachment to a wind turbine hub. A moveable blade section is attached to the fixed blade section and is free to move in a longitudinal direction relative to the fixed blade section. A positioning device controllably positions the moveable blade section to vary the overall length of the blade. This allows the wind turbine's rotor diameter to be adjusted. The rotor diameter can be increased in order to provide high power output in low wind conditions and it can be decreased in order to minimize loads in high wind conditions.

11 Claims, 5 Drawing Sheets

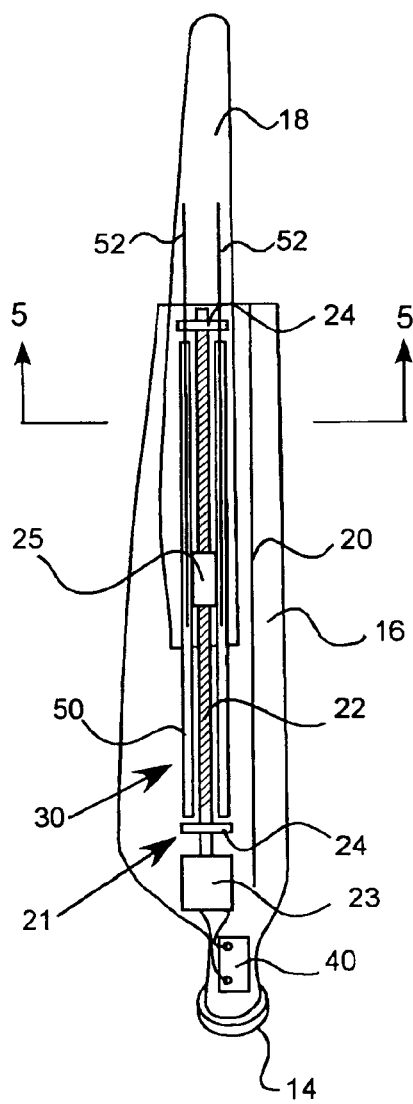
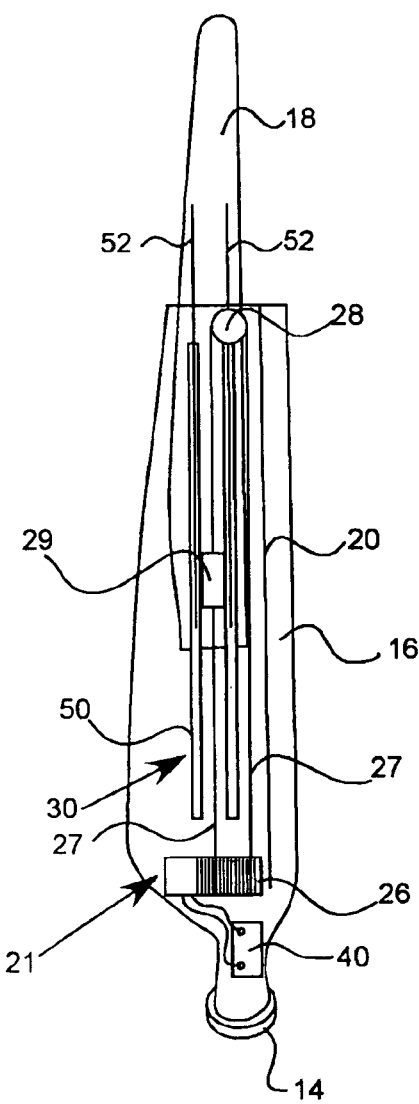
Figure 3    Figure 4
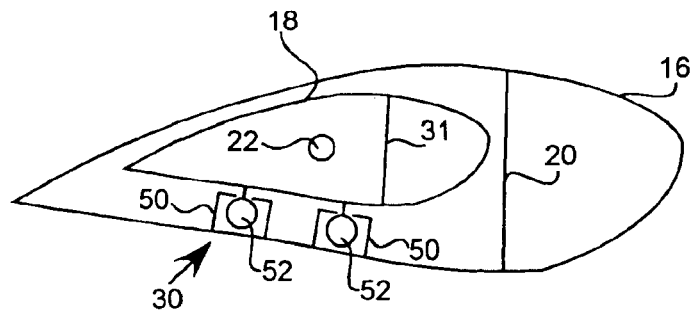
Figure 5

TELESCOPING WIND TURBINE BLADE

FIELD OF THE INVENTION

This invention relates to blades for wind turbines. Specifically, the invention relates to a telescoping blade where the length of the blade is variable.

BACKGROUND OF THE INVENTION

Wind turbines create power proportional to the swept area of their blades. Increasing the length of a wind turbine's blades increases the swept area, which produces more power. A wind turbine's generator, gears, bearings and support structure must be designed around the expected wind load and power production. At low wind speeds very long blades are desirable to get as much power as possible out of the available wind. At high wind speeds a wind turbine must control the power production and the mechanical loads developed. Eventually, the wind becomes high enough that the turbine must shut down to avoid damaging components, so short blades are desirable to keep the turbine producing power in high winds.

The choice of a rotor diameter for a wind turbine is a design trade-off between energy production in low winds and load limitation in high winds. Wind turbine manufacturers often sell a variety of rotor sizes for a given wind turbine model. These rotor sizes are optimized for sites that have a low, medium, or high annual average wind speed. However, the rotor size selected is always a compromise and there are conditions in which the turbine does not perform optimally because the rotor is too big or too small.

It would be desirable to provide a wind turbine with a large rotor that can produce a large amount of power in low wind conditions and a small rotor for limiting power and mechanical loads during high wind conditions. Such a turbine would preferably have a variable diameter rotor that can be adjusted to the current wind conditions.

Many variable diameter rotors have been designed for aircraft. One of the first is shown in U.S. Pat. No. 1,077,187 incorporated herein by reference. Many other variable diameter rotors, and improvements on them, have been patented since. Some of those patents, which are incorporated herein by reference are U.S. Pat. Nos. 3,768,923, 5,299,912, 5,636,969, 5,642,982, and 5,655,879. These rotor designs are all for use on aircraft of various sorts and they lack any teaching to utilize such a rotor on a wind turbine.

In the past when a turbine has been installed in a lower wind speed site than it was originally designed for, blades have been lengthened by adding hub extenders, which space blades out radially from their original mounting. Hub extenders accomplish the goal of increasing the swept area, but present the following disadvantages:

1. Hub extenders cannot be easily changed or removed, because they are relatively heavy devices. Since it requires a crane and hours of labor to change hub extenders on commercial sized wind turbines, they end up being left in place once they are installed.
2. Since hub extenders cannot be easily removed, extra loads are placed on the turbine every time high winds occur, and
3. The length of the hub extenders is limited by the strength of the existing drive train and other components. Either the turbine life is shortened, or the drive train, generator, and other components must be upgraded to withstand the higher loads caused by the longer blades. Since the entire drive train cannot be economically upgraded, the use of hub extenders is limited as a way of increasing the energy output of a wind turbine.

It would be advantageous to provide a way of extending the length of wind turbine blades that is easily reversible so the wind turbine can take advantage of the extra power production of longer blades but not have the liability of long blades during periods of high wind.

Tip brakes are moveable blade sections located at the end of a turbine blade. One design shown in U.S. Pat. No. 4,715,782 incorporated herein by reference, reduces the efficiency of the blade by turning 90 degrees and causing drag. The tip portion of the blade is mounted to a shaft which allows the tip to be rotated 90 degrees to the blade. This acts as a drag which is used as a brake to slow the rotation of the blades. These devices allow the tip of the blade to move longitudinally a short distance in order to disconnect the tip from the end of the blade. Once free of the fixed portion of the blade, the tip is rotated the full 90 degrees to effectively destroy the capability of the blade to produce power. These tip brakes are not designed to operate at any position other than fully rotated, or fully lined up with the blade. Their function is to act as a safety device by reducing the ability of the turbine blade to make power. The longitudinal motion of the tip is minimal, and it serves the purpose of latching and unlatching the tip so it can be rotated.

Another design of tip brakes is shown in U.S. Pat. No. 4,710,101, which is incorporated herein by reference. This device uses a purely telescoping method of braking the wind turbine. A portion of the leading edge of the tip of the blade is extended exposing a non aerodynamic surface to the wind and exposing a non aerodynamic surface at the trailing edge of the blade tip. These factors combine to produce a braking effect. Even though the telescoping action in this design is greater than other tip brake designs the function remains the same; to inhibit power production of the wind turbine by altering the aerodynamic shape of the blade. While tip brakes are made up of a fixed and a moveable blade section, they:

1. do not allow the effective length of the blade to be changed;
2. do not improve the power output of the blade;
3. do not optimize the pitch of the end of the blade with changes in length, and
4. do not operate at positions intermediate to the fully deployed or fully lined up positions.

It would be advantageous to provide a method of reducing the loads and power output of the wind turbine during high winds without inhibiting power production entirely, thus allowing for continued power production in high winds.

SUMMARY OF THE INVENTION

The disclosed invention provides a wind turbine blade that is variable in length in order to change the rotor's cross-sectional swept area and to regulate the amount of power intercepted from the wind. In low wind conditions, the blade length is extended to provide a rotor with maximum swept area so that the maximum amount of power can be extracted from the wind. In high wind conditions, the blade is retracted to minimize aerodynamic loading and to keep structural loads within the design criteria.

The variable length blade of the present invention includes an inboard portion and an outboard portion. The outboard portion is longitudinally moveable relative to the inboard portion. As the outboard portion is moved longitudinally, the effective length of the blade is varied.

The manner of mounting the variable length blade to a wind turbine is identical to methods in present use with blades of fixed length. Namely, the base of the blade is composed of a flange provided with holes or studs which match a wind turbine's hub. This flange or studs are bolted to the wind turbine hub. The hub supports the weight of the blade, and transmits the rotational power and structural loads from the blade to the turbine's drive shaft. Since the mounting of a variable length blade according to the present invention is accomplished in the same manner as a conventional blade, the variable length blades can easily be retrofit onto existing wind turbines. The blade may be mounted to the hub via a pitch bearing so that the pitch angle of the blade can be adjusted. The present invention also works with pitch bearings and variable pitch rotors.

A typical wind turbine has two or three blades. To maintain balance, all of the blades on a turbine should be variable length blades. If the blade length is adjusted while the turbine is running, all blades must be moved simultaneously to keep the mass balanced. As an optional feature, the blades could be individually adjustable to allow for mass balancing of the rotor in real-time. The length of the blade is changed by activating a drive mechanism. The drive mechanism may be activated manually or automatically. The drive mechanism is activated in response to wind speed and/or generator output as follows:

During periods of low wind, the blades are moved to their longest position to provide the largest possible swept area. This maximizes power production. As the wind speed increases, the turbine will produce more power. When the level of power production starts to exceed the maximum capability of the wind turbine, the blade length can be reduced until the resulting swept area and power production are within safe limits for the turbine. This prevents the turbine from being driven too hard in high winds. The simple longitudinal movement of the blade can be achieved while the blade is rotating through the use of conventional drive mechanisms and actuators. These include rotating unions, slip rings, hydraulic rams, cable drives, and screw drives, etc. As the wind speed continues to increase, the blade can be further shortened, until reaching the shortest position. This shortest position allows the turbine to continue running during periods of high winds without overloading the drive train or other components.

Since the blade can be incrementally adjusted, blade length can be set to maximize power production over a wide range of wind speeds, while preventing excessive loads on the turbine drive train. As wind speeds slow down from a high speed condition, power output drops, and the blade length can be increased to continue producing the maximum amount of power for which the drive train and other components are rated. At low wind speeds, the blades are again set to their longest position to produce the maximum possible power. In low winds, power output of the variable length blades will be greater than what which would be produced by a shorter conventional blade. Because of the great number of hours with wind speeds less than 15 miles per hour at most locations, the variable length blade will end up in the longest position for several thousand hours per year. This increases annual production, while the ability to shorten the blades when the wind does blow hard saves the turbine from damage that would otherwise be caused by oversized conventional blades. Also shortening the blades delays the braking and high wind shutdown of the turbine until winds are extremely strong, thus extending the total amount of time that power is being produced.

It is an object of the present invention to provide an adjustable length wind turbine blade which directly changes the amount of power produced at a specific wind speed. This enables the wind turbine to produce more power than it would with conventional blades.

It is an object of the present invention to provide an adjustable length wind turbine blade that can be changed in length with a minimum of manpower, rapidly, without the use of a crane or other heavy equipment to any position between the blades' longest and shortest settings, allowing for many length changes in the course of a day.

It is an object of the invention to provide a variable length wind turbine blade which can have its length adjusted while the turbine is operating, eliminating the need for a shut down adjustment of blade length.

It is an object of the invention to provide a variable length wind turbine blade which can be adjusted automatically to compensate for any combination of the following: wind speed, power output, strain on mechanical components, temperature, air density, and any other factors for which blade length might compensate. This allows for trouble free operation and maximization of the wind turbine's availability.

It is an object of the present invention to provide a variable length wind turbine blade which, by reducing forces acting on the drive train, allows the turbine to produce more power during the year without increasing the size of major components such as the gearbox and generator. Producing more power with the same size drive train lowers the cost of producing electrical energy.

It is an object of the present invention to provide a variable length wind turbine blade which can extend its length to produce more power in light winds, thus increasing power output over most of the time in the year.

It is an object of the present invention to provide a variable length wind turbine blade which can, in its shortest position, run in higher winds than a turbine equipped with conventional blades, thus improving power production in strong winds.

It is an object of the present invention to provide a variable length wind turbine blade which in periods of high winds can be adjusted to limit structural loads on the wind turbine and on the blades. This reduces wear and decreases the possibility of catastrophic failure, thus increasing safety while decreasing maintenance costs.

It is an object of the present invention to provide a variable length wind turbine blade in which the moveable portion of the blade can be rotated as it is extended to optimize the pitch angle of the blade as it is changed in length. Optimized pitch angles produce the maximum power from an airfoil.

It is an object of the present invention to provide a variable length wind turbine blade which is compatible with most existing wind turbines because it uses standard mounting hardware, and can be adapted to incorporate features such as tip brakes. Thus the blade is compatible with existing fixed pitch, variable pitch, and variable speed turbines as well as suited for incorporation into new designs.

It is an object of the present invention to provide a variable length wind turbine blade which in its retracted position is shorter and therefore easier to transport than a longer one piece blade. The present invention can be fully assembled in its retracted position and requires no assembly on site.

It is an object of the present invention to provide a variable length wind turbine blade which is simply constructed thus making it capable of many adjustments in length with minimum need for maintenance.

It is an object of the present invention to provide a variable length wind turbine blade which is constructed of greater than two parts increasing the range of possible lengths, thus increasing the benefit disclosed in the foregoing objects.

It is an object of the present invention to provide a variable length wind turbine blade that is compatible with conventional hub designs so that the blade can be retrofit onto existing wind turbines.

It is an object of the present invention to provide a variable length wind turbine blade that is compatible with various types of turbines. It is intended that the blades can be used on stall controlled turbines, pitch controlled turbines, and variable speed turbines. The variable length blades can also incorporate tip brakes.

The foregoing objects and advantages of the invention will be more fully understood from the following detailed description of the invention and the accompanying drawings.

BRIEF DESCRIPTION OF THE DRAWINGS

FIG. 3 is a partial cutaway view of a variable length blade according to the present invention.

FIG. 4 is a partial cutaway view of a variable length blade with to a second preferred embodiment of the moveable blade actuation system.

FIG. 5 is a sectional view taken along lines 5—5 in FIG. 3.

DETAILED DESCRIPTION OF THE INVENTION

Figure 1:
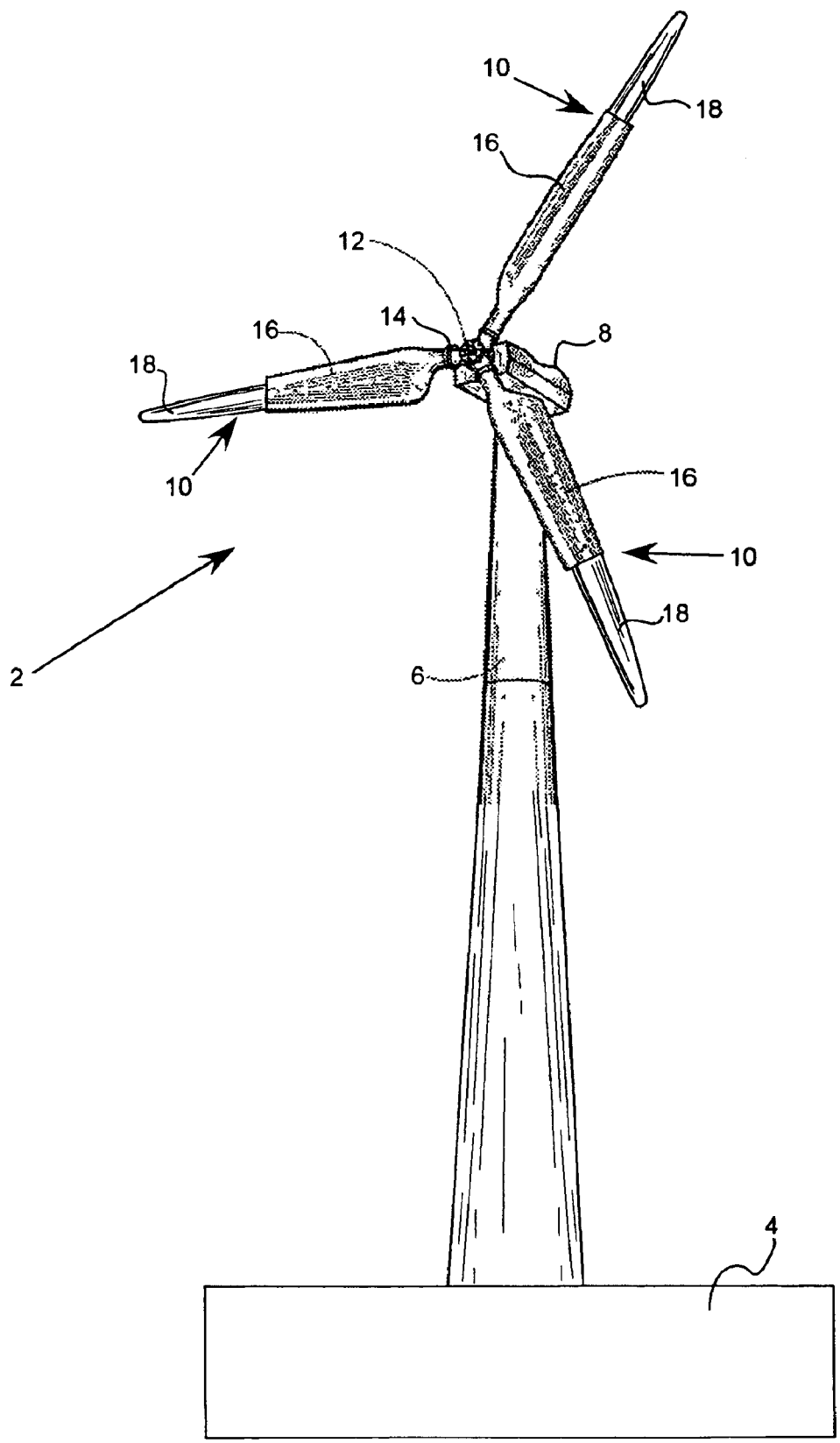
FIG. 1 shows a wind turbine with variable length blades according to the present invention in their extended position.

The variable length rotor blade of the present invention is described herein for use with an electricity-producing wind turbine 2 as shown in FIG. 1. The wind turbine 2 consists of a foundation 4, a tower 6, a nacelle 8, and a number of variable length blades 10 according to the present invention. There are typically two or three blades 10 on an electricity-producing wind turbine 2. The blades 10 are attached to a hub 12 by a bolt flange 14. Alternatively, the blades 10 can incorporate studs that are embedded in the structure of the blade and bolted to the hub 12. The bolt flange 14 on most wind turbines 2 is one of several standard sizes so that retrofitting existing wind turbines 2 with new blades 10 is relatively simple. U.S. Pat. No. 4,915,590, the teachings of which are incorporated herein by reference, describes various types of blade-hub connections.

Figure 2:
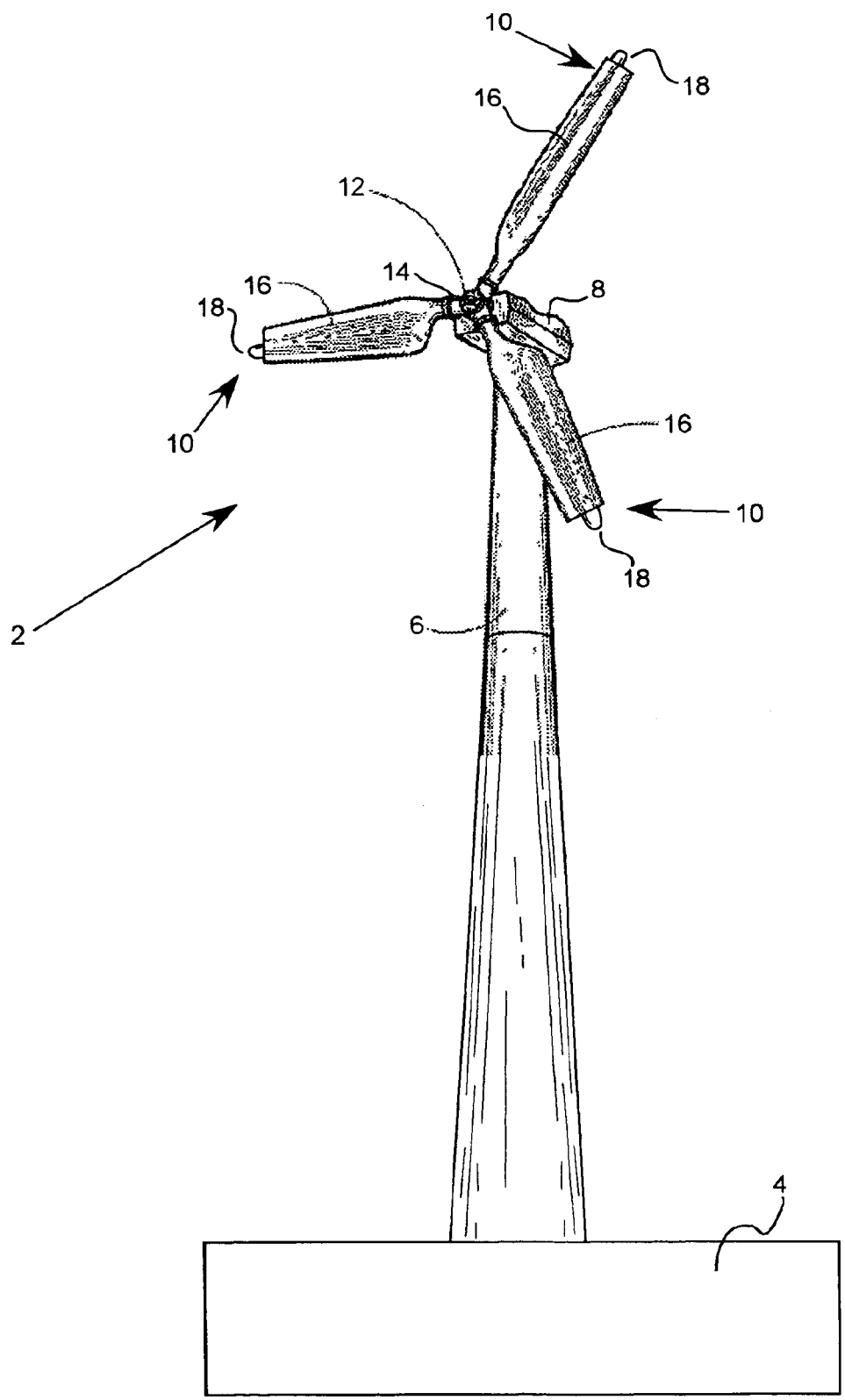
FIG. 2 shows a wind turbine with variable length blades according to the present invention in their retracted position.

The variable length blades 10 consist of two portions. There is a fixed blade section 16 which is rigidly attached to the hub 12 and a movable blade section 18 which can be extended or retracted. The movable blade section 18 is shown in FIG. 1 is in an extended position and is shown in FIG. 2 in a retracted position. As the blades are extended, the effective diameter of the wind turbine's rotor increases. As the blades are retracted, the diameter decreases. Power production is proportional to the rotor diameter squared so that a small change in rotor diameter can provide a relatively large change in power output. Furthermore, many structural loads are proportional to rotor diameter raised to the fifth power (if the rotational speed remains constant as the blade diameter is increased) so that a dramatic reduction in loads is possible when the blades are retracted.

FIG. 3 is a view of the variable length blade 10 showing all of the major components of the blade extension and retraction system. The bolt flange 14 is at the base of the fixed blade section 16 and a structural shear web or spar 20 extends down the length of the fixed blade section 16. The spar 20 is shown as being near the leading edge of the blade. It is typical for the spar to be closer to the 40% chord location, but the spar location must allow clearance for the extendable blade portion 18 of the present invention. Detailed design analysis is required to determine the best location and the necessary size of the spar 20. One of ordinary skill in the art is capable of designing a blade with a spar located in the forward portion of the blade chord to allow clearance for the telescoping blade mechanism.

The blade 10 including the fixed portion 16 and the moveable portion 18 are contemplated to be made of conventional fiberglass materials. However, they may be made of carbon composite material, laminated wood fiberglass composite, metal, or any other suitable material. Other than relocation of the spar 20 in the fixed blade portion 16, the blade design is similar to conventional blades in most respects. The blade 10 is shaped as an airfoil. The type of airfoil selected is a matter of design choice and one of ordinary skill in the art would be able to select a suitable airfoil. The preferred airfoil is selected from the family of wind turbine airfoils developed by the National Renewable Energy Laboratory and described in U.S. Pat. Nos. 6,068,446, 5,562,420, and 5,417,548. The blades 10 may employ twist and taper or they can be simple structures with constant cross sections along their length.

One of the issues that the present invention presents to blade designers is that of structural dynamics. A wind turbine blade has certain characteristic natural frequencies and mode shapes which can be excited by mechanical or aerodynamic forces. Blade designers are very careful to tailor the stiffness and mass of the blade so that it will be dynamically stable during operation. The present invention presents additional challenges because the stiffness and mass distribution changes as the moveable blade portion 18 is translated in and out of the fixed blade portion 16. However, a wind turbine blade designer of ordinary skill in the art would be capable of successfully addressing these issues in the blade design as long as they are taken into consideration. Structural dynamic issues are particularly important if the present invention is to be used on a variable speed wind turbine. The issue of structural dynamic considerations in a telescoping aircraft blade are addressed in U.S. Pat. No. 5,636,969, the teachings of which are incorporated herein by reference. Additional information on blade design for wind turbine applications can be found in several textbooks including *Wind Turbine Engineering Design*, written by Eggleston and Stoddard and published by Van Nostrand Reinhold in 1987, *Windturbines*, written by Hau and published by Springer in 2000, *Wind Turbine Technology*, edited by Spera and published by ASME Press in 1994, and *Wind Energy Conversion Systems*, written by Freris and published by Prentice Hall in 1990, all of which are incorporated herein by reference.

Movement of the movable blade section 18 is guided within the fixed blade section 16 by a linear blade guide 30. The linear blade guide 30 can be a relatively complex or they can be quite simple. Simplicity in design is preferred insofar as that it reduces cost and maintenance requirements. In the preferred embodiment, the linear blade guide is simply a sliding connection. A pair of slider tracks 50 are mounted on the fixed portion 16 of the blade 10. A mating pair of sliders 52 are attached to the moveable portion 18 of the blade 10. The sliders 52 are guided within the slider tracks and restrain the moveable blade portion 18 from moving in any direction other than longitudinally. The slider tracks 50 and sliders 52 are preferably made out of steel, although any material that can withstand the forces imposed by the blade sections can by used. The slider tracks 50 and sliders 52 preferably have a low friction contact between them. Wear is likely to be a significant issue with the present invention and the designer should take care to design the slider tracks 50 and sliders 52 in a way that they will require very little maintenance. The designer should also take care that the sliders 52 do not bind as the blade 10 flexes under aerodynamic loading. Binding is not expected to be a critical issue, but should be considered in the blade design. Alternate choices to replace the slider tracks 50 and sliders 52 could include linear bearings, low friction pads, shaped sections made of plastic, aluminum, or other materials, or a simple nesting of the moveable blade section 18 into the fixed blade section 16.

The movable blade section 18 is caused to move by an actuating device 21. The range of linear travel of the movable blade portion is between a fully retracted position and a fully extended position. In the fully retracted position the tip of the movable blade section 18 is only minimally exposed or not exposed at all. In fully retracted position the base of the movable blade section 18 is at a position deep within the fixed blade section 16 but is not interfering with any of the other components of the system such as the linear actuator 21. In the fully extended position, the base of the movable blade section 18 is extended to the furthest point at which the movable blade section 18 receives adequate structural support from the fixed blade section 16. The actuating device 21 shown here as part of the preferred embodiment is in the form of a threaded rod 22 and a motor 23 that turns the threaded rod 22. The threaded rod is supported by bearings 24 that are attached to the fixed blade portion 16. A set of stacked nuts 25 is attached to the moveable blade portion 18 and in engagement with the threaded rod 22 so that they extend and retract the moveable blade portion 18 as the motor 23 turns the threaded rod 22. The linear actuating device 21 must be able to position the movable blade section 18 anywhere in the full range from fully extended to fully retracted.

In case of loss of grid power, it would be desirable to be able to retract the blades to assist with braking. In this case, there will not be power available to operate the actuating device 21. Therefore, it is preferred that a battery 40 is provided in the rotor to provide emergency backup power for the actuating device 21. A single battery 40 may be provided in the hub 12 to provide backup power for the actuating devices 21 on all of the blades 10.

FIG. 4 shows a second preferred embodiment for the actuating device. In this embodiment, the actuating device 21 consists of a winch 26 with a cable 27 that is controlled by the winch 26. The cable 27 is double-wound onto the winch 26 so that one end of the cable 27 is pulled in by the winch 26 while the other end is being let out. The cable 27 is supported and guided on the outboard end of the fixed blade section 16 by a pulley 28. A retention block 29 is attached to the moveable blade portion 18 and the retention block 29 grips the cable 27 so that the moveable blade portion 18 is moved longitudinally when the winch 26 advances or retracts the cable 27.

Other possible embodiments of the actuating device 21 include a hydraulic cylinder, a motor attached to the movable blade section 18 with teeth that engage a track in the fixed blade section 16, or other suitable techniques for providing linear motion to the moveable blade portion 18. One of ordinary skill in the art will recognize that there are many different possible drive mechanisms, and any suitable mechanism is intended to fall within the scope of the present invention. One method for use in a two bladed wind turbine would be to use a rack and pinion system with a rack attached to each of the moveable blade portions 18 and the pinion located in the hub 12. This would mechanically constrain the blades to extend and retract at the same rate and would eliminate the need for an electronic control to keep the length of the blades 10 the same.

It is important that all three moveable blade portions 18 are extended and retracted at the same time and by the same amount so that the blades remain balanced, both in terms of dynamic mass balance and in terms of aerodynamic balance. In the preferred embodiment, an automatic controller monitors the positions of the blades and ensures that they are equally extended. However, in an alternate embodiment, it could be desirable to provide separate and individual extension and retraction for each of the moveable blade portions 18. In this way, it would be possible to correct for inequalities in mass or aerodynamic balance of the blades and the loads on the rotor may be kept in balance. In this alternate embodiment, it would be necessary to provide an accelerometer, strain gages, or some other sensor to monitor the balance of forces on the rotor. The extension of each of the moveable blade portions 18 could be individually adjustable in response to the measured load balance on the rotor in order to better balance the aerodynamic and mechanical loads. Information about blade balancing can be found in U.S. Pat. No. 5,219,454 which is incorporated herein by reference. By individually extending and retracting the moveable blade portions 18 it would be possible to continuously adjust the rotor's balance in real time.

In an alternate embodiment, the slider tracks 50 and the sliders 52 could be formed in a spiral shape so that they have a small amount of twist. In this embodiment, the moveable portion of the blade 18 is rotated, or pitched, as it is extended and retracted. This allows the entire length of the blade 10 to be twisted and allows the pitch angle of the blade to be varied along with the blade length. Additional performance enhancements can be realized by forming the slider tracks 50 and sliders 52 in this configuration. However, it also increases the complexity of manufacturing the device.

FIG. 5 shows a cross sectional view of the variable length blade 10 of the present invention along lines 5—5 in FIG. 3. The movable section 18 is nested within the fixed section 16 and both have an airfoil shape. The movable section 18 is sufficiently smaller than the fixed section 16 to allow space for the spar 20. Moveable blade section 18 also includes a spar 31 which must be sized and spaced appropriately to allow clearance for the threaded rod 22. The linear support structure 30 is clearly shown here in the form of mating lubricated surfaces 50 and 52. Component 50 is a slider track that is attached to the fixed blade portion 16 and component 52 is a slider that is attached to the moveable blade portion 18. The exact shape and form of the slider track 50 and the slider 52 can be modified within the scope of the present invention. Also it is conceivable that the present invention could employ a movable section 18 with a tip brake mechanism, although the need for tip brakes is dramatically reduced by the action of the retractable blades 10. If a tip brake is used, it would be necessary to route control wires to the outboard end of the moveable blade section 18. One of ordinary skill in the art would be able to design a suitable control wire guide.

Several alternate embodiments of the present invention are shown schematically in FIGS. 6 through 9.

Figure 6:
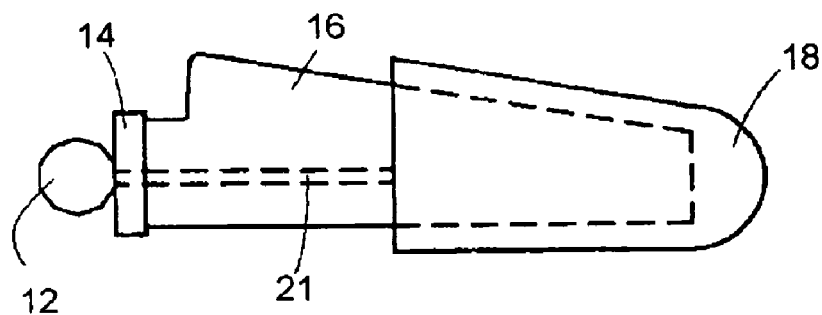
FIG. 6 is a schematic view of a second preferred embodiment of variable length blade according to the present invention.

FIG. 6 shows an embodiment in which the moveable blade portion 18 is larger than the fixed blade portion 16 and telescopes over the outside of the fixed blade portion 16.

Figure 7:
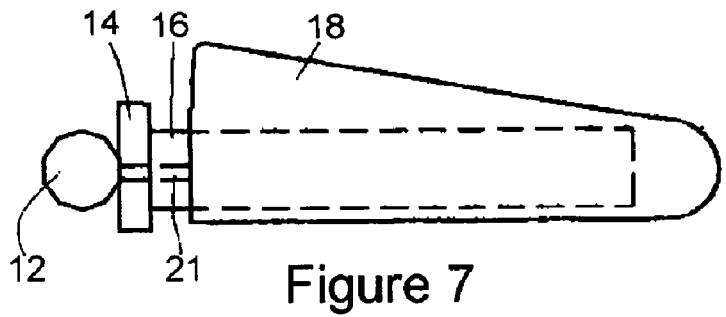
FIG. 7 is a schematic view of a third preferred embodiment of variable length blade according to the present invention.

FIG. 7 shows an embodiment in which the fixed blade portion 16 is a structural support spar that may or may not have an aerodynamic shape. This is similar to the device described in U.S. Pat. No. 3,768,923, which is incorporated herein by reference, and subsequent patents describing aircraft rotors with variable diameter.

Figure 8:
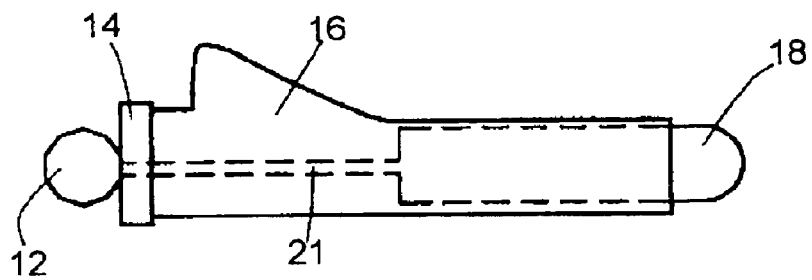
FIG. 8 is a schematic view of a fourth preferred embodiment of variable length blade according to the present invention.

FIG. 8 shows a blade in which both the fixed blade portion 16 and the moveable blade portion 18 are constant cross section (non-twisted and non-tapered) along most of their length. This simplifies blade manufacturing although it decreases the rotor's performance somewhat. The enhancement to rotor performance from the telescoping blades is likely to far outweigh the advantage from twist and taper. With the performance enhancement of the telescoping blades, the manufacturing simplicity of the constant cross section blades could be very attractive.

Figure 9:
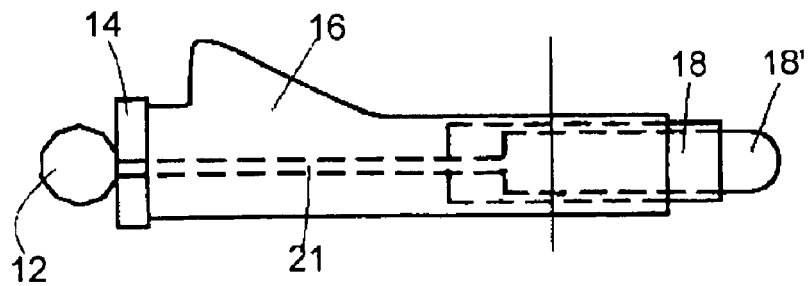
FIG. 9 is a schematic view of a fifth preferred embodiment of variable length blade according to the present invention.

FIG. 9 shows a blade with two moveable blade sections 18, labeled as 18 and 18' in the drawing. This embodiment increases the complexity of the invention, but it allows a significantly greater degree of variation in the rotor diameter. The greater variation in rotor diameter could possibly provide enough enhancement of power production and enough attenuation in loads to justify the added complexity. In this embodiment, the actuator 21 would have to move the second moveable blade portion 18' by a distance twice as great as the first moveable blade portion 18. The embodiment shown in FIG. 9 could be arranged with the three blade sections 16, 18, and 18' nested within each other as shown or it could be arranged so that moveable section 18 is larger than fixed section 16 and telescopes outside the fixed section 16. In that case, the second moveable blade section 18' would be even larger still and would telescope on the outside of the first moveable blade section 18.

Figure 10:
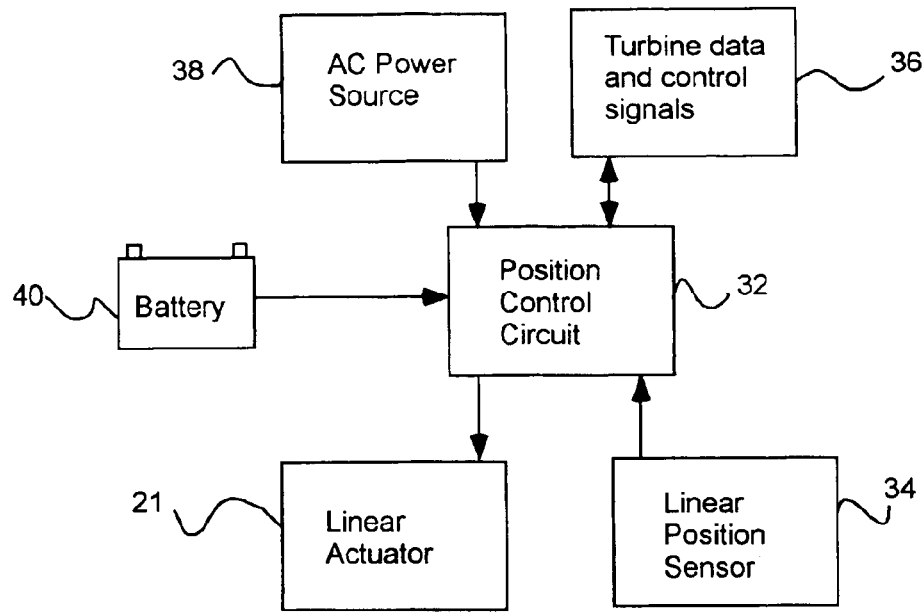
FIG. 10 shows a block diagram of a control and power circuit for the actuator of the variable length blade according to the present invention.

FIG. 10 shows a block diagram of one possible embodiment of a controller for the present invention. The actuating device 21 is powered and controlled by a position control circuit 32. The position control circuit receives data and power from components in the nacelle 8 or other stationary part of the wind turbine 2 such as a programmable logic controller, a generator, an anemometer, etc. The power and data are transferred to the position control circuit 32 from the stationary nacelle 8 to the wind turbine's rotor across a set of slip rings then along power and data cables. The position control circuit 32 also receives data from a sensor 34 within the blade 10 that detects the linear position of the movable blade section 18. This data could come from a variety of types of linear position sensors 34. A plurality of proximity sensors could be placed along the length of the fixed blade section 16, a linear variable differential transformer (LVDT) could directly transduce the position of the blade, a position sensor could be incorporated into the linear actuator 21. In the preferred embodiment, a rotational sensor 32 is placed on the shaft of the threaded rod 22 to detect linear position.

There may be one position control circuit 32 per blade 10 in which case the position control circuit 32 would be in communication with the other position control circuits 32 in order to maintain equal length amongst the blades 10, or alternatively one position control circuit 32 could be used for all the blades 10 on the wind turbine. It should be noted that all or part of the position control circuit 32 and its functions may be located remotely from the blade 10 or integrated as part of the wind turbine's main controller. The position control circuit 32 may also communicate with the pitch controller if the turbine is a variable pitch machine, or with the speed controller if it is a variable speed turbine.

In case of a power outage it would be desirable to have the blades 10 move to the fully retracted position. In order to power the actuating device 21 a battery 40 is provided to supply backup power. The position control circuit 32 should contain circuitry to sense the power outage, switch to battery 40 power, and retract the movable blade sections 18. Furthermore the position control circuit 24 should contain circuitry to charge the battery 40 once power is restored to the system.

The position control circuit 32 shares appropriate data with the relevant turbine data and control components 36 of the wind turbine, which may include a programmable logic controller (PLC) or other controller, a Supervisory Control and Data Acquisition (SCADA) system, and/or other devices. If the turbine operates at variable speed, then the control circuit 32 would certainly need to communicate with the turbine's speed controller to maintain the appropriate tip speed for the blades. As the turbine's rotational speed increases, the blade length should be retracted in order to maintain a constant tip speed ratio. If a gust of wind increases faster than the turbine's speed controller can respond, it would be possible to increase the rotor diameter while increasing the rotational speed in order to increase the turbine's tip speed at the same rate that the wind speed increases.

The position control circuit 32 transmits information on blade 10 position, battery 40 voltage, and any other relevant data. The position control circuit 32 may receive information such as turbine power output, wind speed, grid availability, or other data. The position control circuit 32 receives power from an AC power source 38 that would be supplied from the turbine's main control panel. There may be a circuit for modifying the voltage and/or rectifying the AC power as part of the position control circuit 32 because the linear actuator 21 preferably operates on 12 VDC power. The position control circuit 32 powers the linear actuator 21 and receives data from the linear position sensor 34, thus controlling and sensing position of the movable blade section 18.

There are many control algorithms that may be employed to determine the blade 10 length at a given time. Furthermore the variable length wind turbine blade 10 is adaptable to a broad range of the possible algorithms. Many of the decisions governing which control algorithm should be used involve considerations that are site and turbine specific. Thus it should be left to one skilled in the art to program a control algorithm for the specific purpose the blade 10 is intended for. For instance, the control algorithm for a variable pitch turbine would be significantly different than that for a stall controlled turbine. A sample simple control algorithm is presented here by way of example but any control algorithm used to manipulate a variable diameter wind turbine blade 10 could be substituted. One of ordinary skill in the art would be able to devise an appropriate control algorithm.

Figure 11:
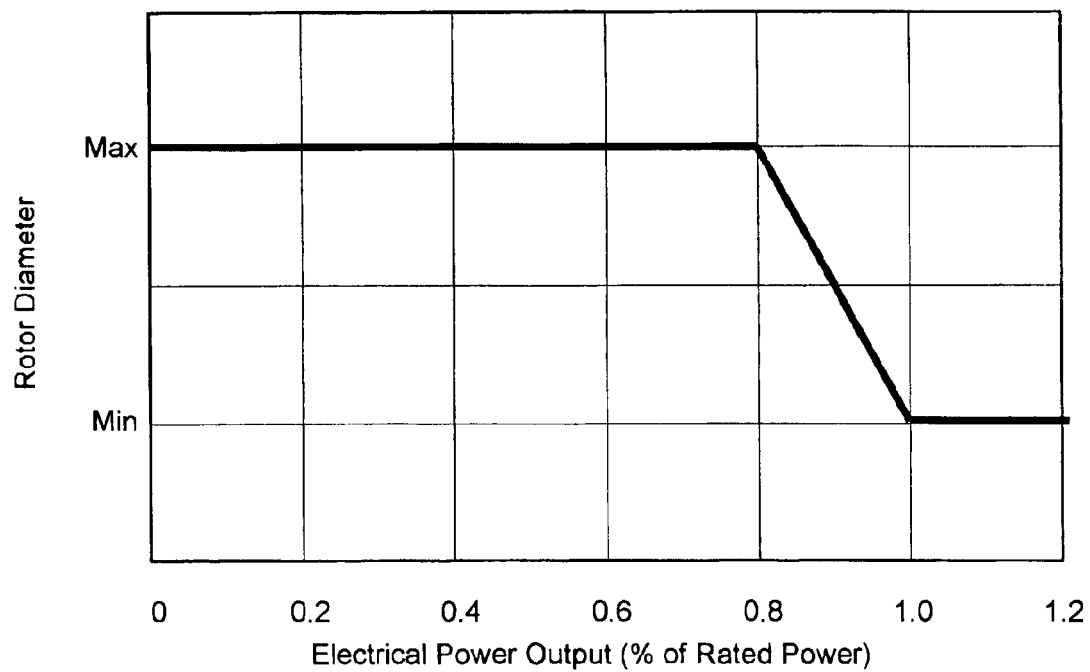
FIG. 11 is graph showing one possible control algorithm for use with the variable length blade of the present invention

One possible control algorithm is shown graphically in FIG. 11. The position control circuit 32 would adjust the movable blade section 18 according to the power output produced by the wind turbine. At low power production levels the blade 10 would be at its longest position. Once power production increases to a first set point (80% of rated power as shown in FIG. 11) the length of the blade would steadily decrease as power output increases until power production reaches to a second set point (100% of rated power as shown in FIG. 11) at which point the blade would be at its shortest setting. The blade would stay in its shortest setting if power output increases above 100% capacity, at which point the turbine would possibly be undergoing a braking procedure. As the power output decreases, blade length simply follows the reverse of the above algorithm, unless the decrease in power output is due to braking or a fault condition. It should be noted that the rate of change of blade length should be kept slow enough such that turbulence and gusts do not cause undue exercising of the actuator 21 and fast enough to protect the turbine when wind speed increases rapidly in turbulent wind conditions.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

We claim:

1. A wind turbine comprising:
a rotor with a plurality of blades which rotate about a substantially horizontal axis wherein said rotor has a diameter defined by the area swept by said blades;
a mechanism for varying the diameter of said rotor; and
a controller for controlling the mechanism that varies the diameter of said rotor, wherein said controller monitors the power output of said wind turbine and wherein said controller decreases the diameter of said rotor when the power output exceeds a first predetermined level and increases the diameter of said rotor when the power output is less than a second predetermined level, so as to avoid undue exercising of the mechanism for varying in variable wind conditions.

2. A wind turbine blade comprising:
an inboard end that is proximate an axis of rotation;
an outboard end that is distant from said axis of rotation;
a structure extending between said inboard end and said outboard end wherein at least a portion of said structure has an airfoil shaped cross-section that provides aerodynamic lift; and
a mechanism for varying the distance between said inboard end and said outboard end, wherein said blade defines a longitudinal axis between said inboard end and said outboard end and further comprising a fixed section proximate said inboard end, a moveable section proximate said outboard end, and a mechanism for moving said moveable section relative to said fixed section along a path that is substantially parallel to said longitudinal axis, wherein at least a portion of both said fixed section and said moveable section has an airfoil shaped cross-section, and wherein said moveable section is sized and shaped to nest inside of said fixed section wherein said mechanism for moving said moveable section relative to said fixed section comprises a threaded rod, the threaded rod being adapted to rotate to cause movement of the moveable section of said wind turbine blade;

further wherein said mechanism for varying the distance between said inboard end and said outboard end comprises a slider track and a slider, the slider being guided within the slider track dining movement of the moveable section.

3. The wind turbine blade of claim 2, wherein each slider track and slider is one of a pair of slider tracks and sliders, the sliders being guided within the slider tracks to restrain the moveable section from moving in any direction other than said path substantially parallel to said longitudinal axis.

4. The wind turbine blade of claim 2, wherein said mechanism for moving said moveable section relative to said fixed section further comprises an actuator adapted to rotate said threaded rod.

5. The wind turbine blade of claim 2, wherein the slider track and the slider are in only sliding contact with each other.

6. A method of controlling a wind turbine comprising the steps of:
providing a rotor with a plurality of blades and a diameter defined by the area swept by said blades;
providing a mechanism for adjusting the diameter of said rotor;
measuring the power generated by said wind turbine; and
adjusting the diameter of said rotor during operation of said wind turbine based on said power measurement such that turbulence and gusts do not cause undue exercising of the mechanism for adjusting the diameter of said rotor.

7. The method of claim 6 wherein the step of adjusting the diameter of said rotor comprises following a control strategy that includes three operating regions wherein the first region is defined by power generated by said wind turbine being below a first predetermined level and the diameter of said rotor being at a maximum, the second region is defined by power generated by said wind turbine being between said first predetermined level and a second predetermined level and the diameter of said rotor varying as a function of said power measurement, and the third region is defined by power generated by said wind turbine being above said second predetermined level and the diameter of said rotor being at a minimum.

8. A wind turbine blade comprising:
an inboard end that is proximate an axis of rotation;
an outboard end that is distant from said axis of rotation;
a structure extending between said inboard end and said outboard end wherein at least a portion of said structure has an airfoil shaped cross-section that provides aerodynamic lift; and
a mechanism for varying the distance between said inboard end and said outboard end, wherein said blade defines a longitudinal axis between said inboard end and said outboard end and further comprising a fixed section proximate said inboard end, a moveable section proximate said outboard end, and a mechanism for moving said moveable section relative to said fixed section along a path that is substantially parallel to said longitudinal axis, wherein at least a portion of both said fixed section and said moveable section has an airfoil shaped cross-section, and wherein said moveable section is sized and shaped to nest inside of said fixed section;

wherein said mechanism for varying the distance between said inboard end and said outboard end comprises a cable supported on the fixed section of the wind turbine blade by a pulley and controlled by a winch, further wherein the mechanism for varying the distance is able to maintain the moveable section in an extended position relative to the fixed section when the wind turbine blade is not rotating about said axis of rotation.

9. The wind turbine blade of claim 8, wherein the mechanism for varying the distance is adapted to move the moveable section in one direction when the winch advances the cable and in an opposite direction when the winch retracts the cable.

10. The wind turbine blade of claim 8, wherein the cable is double-wound onto the winch such that one end of the cable is pulled in by the winch while another end of the cable is being let out by the winch.

11. The wind turbine blade of claim 8, further comprising a retention block attached to the moveable section and to the cable such that the moveable section is moved longitudinally when the winch operates.

* * * * *